W. L. McCLOY.
PIPE JOINT.
APPLICATION FILED DEC. 22, 1915.
1,189,147.
Patented June 27, 1916.
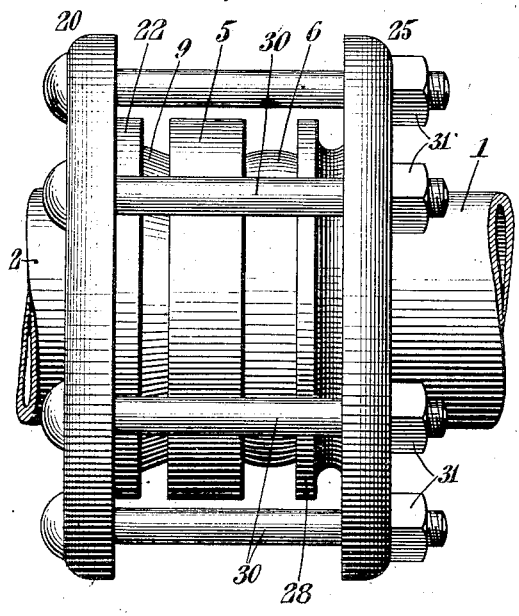
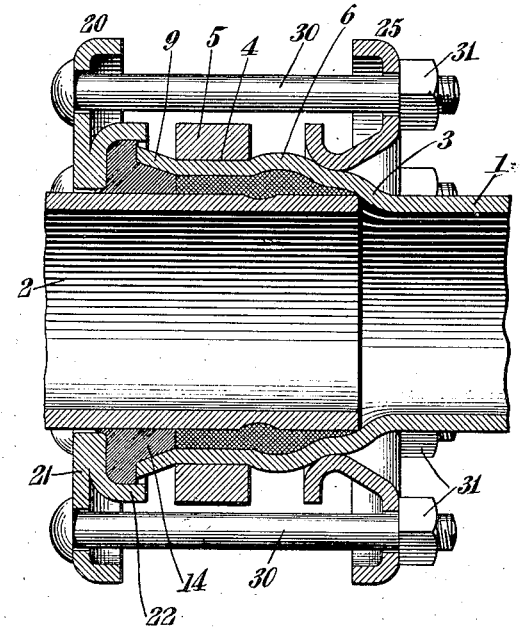
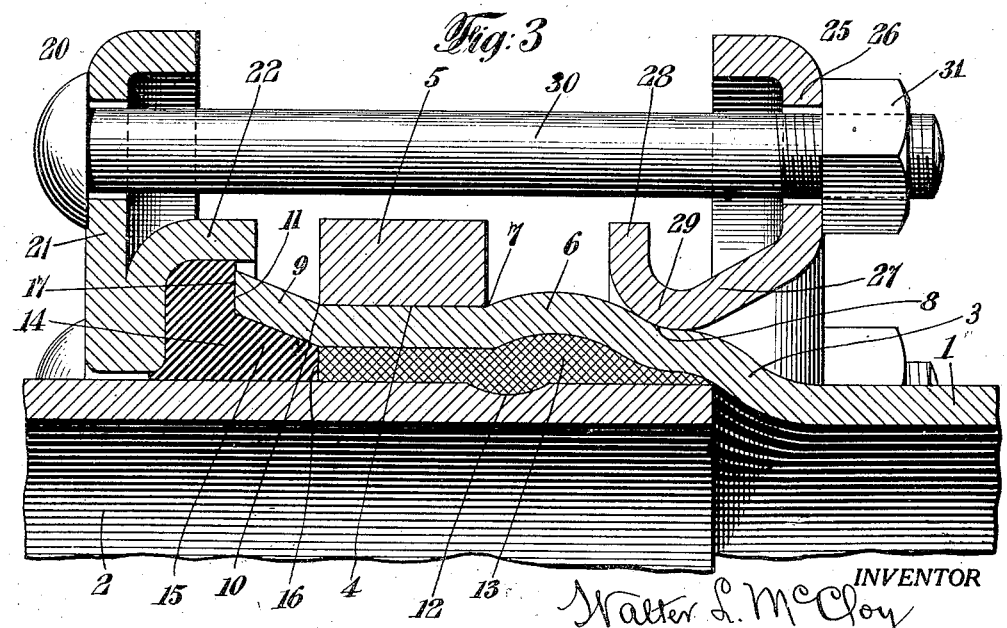
INVENTOR
Walter L. McCloy
BY
Whitaker & Prevost
ATTORNEYS

UNITED STATES PATENT OFFICE.

WALTER L. McCLOY, OF PITTSBURGH, PENNSYLVANIA, ASSIGNOR TO S. R. DRESSER MANUFACTURING COMPANY, OF BRADFORD, PENNSYLVANIA, A CORPORATION OF PENNSYLVANIA.

PIPE-JOINT.

1,189,147. Specification of Letters Patent. Patented June 27, 1916.

Application filed December 22, 1915. Serial No. 68,120.

*To all whom it may concern:*

Be it known that I, WALTER L. McCLOY, a citizen of the United States, residing at Pittsburgh, in the county of Allegheny and State of Pennsylvania, have invented certain new and useful Improvements in Pipe-Joints; and I do hereby declare the following to be a full, clear, and exact description of the invention, such as will enable others skilled in the art to which it appertains to make and use the same.

My invention consists in the novel features hereinafter described reference being had to the accompanying drawings in which I have shown one embodiment of my invention selected by me for purposes of illustration and the said invention is fully disclosed in the following description and claims.

Referring to the accompanying drawings: Figure 1 is an elevation of one form of pipe joint embodying my invention and selected by me for purposes of illustration. Fig. 2 is a sectional view of the same. Fig. 3 is an enlarged detail of a portion of the joint showing the parts in section on a larger scale.

My invention is an improvement upon the pipe joint known in the trade as the Matheson & Dresser joint in which a leak clamp is used to reinforce a Matheson joint. The Matheson joint, *per se*, ordinarily comprises a wrought metal pipe section having one end provided with an expanded bell, the outer end of which is surrounded by a reinforcing ring, the said bell being constructed to receive the opposite plain end of a corresponding pipe section and being one of the forms of bell and spigot joints, the space between the bell and the spigot being sealed ordinarily with lead.

In the Matheson & Dresser joint a rubber gasket is applied to the outer end of the bell and the lead packing, and is engaged by a clamping ring. A ring or follower is applied to the outside of the bell and the two rings are connected by clamping bolts. The clamping rings may be applied at the time the joints are made in the pipe line in which case the clamping rings may be made in one piece, or the clamping rings and gasket may be applied as a repair measure after the pipe line is laid in which case the clamping ring and bull ring are ordinarily made in sections and bolted or otherwise secured together to facilitate their application to the pipe line without shutting off the service pressure in the line or otherwise interfering with the line.

The use of lead packing in pipe joints laid under ground is objectionable owing to the longitudinal movement of the pipe sections in expanding and contracting under variations of temperature which tends to loosen the lead or other solid non-elastic packing such as cement, etc., sometimes used in place of lead. The Matheson & Dresser joint is intended to prevent or repair leakage caused in this manner.

My invention proceeds along an entirely different line and has for its object the provision of a joint which is intended to be installed complete at the time of laying the pipe line, in which a tight joint is secured by means of a packing ring of rubber or other elastic material contained within a packing recess, at the outer end of a bell formed on one end of a pipe section and which receives the plain or spigot end of another section, the space within the bell and in rear of the packing recess being filled with lead or other non-elastic packing not affected by gasolene, drip oil, or other liquids, which may be passed through the pipe line or may condense therein, or otherwise find access thereto, the said non-elastic packing serving the double purpose of assisting in rendering the joint tight and solid while at the same time protecting the rubber packing ring from depreciation by reason of the aforesaid materials or any other material within the pipe line.

My invention also has for its object the forming of a new and improved bell end for a pipe section in which an integral outwardly extending lip is formed at the extreme outer end of the bell or enlarged portion of the pipe section exterior to the reinforcing ring, the said reinforcing ring being located between said lip and an outwardly projecting annular rib or expanded portion near the base of the bell and being thereby firmly held against the possibility of movement longitudinally of the pipe section.

My invention also contemplates in the new and improved joint herein shown and described the use of a packing ring having beveled portions adapted to fit and extend into the packing recess formed by the said lip on the end of the bell, and also having a shoulder to engage the exterior end face of the lip so that the clamping ring will force a portion of the packing ring into said recess between the spigot and the lip and preferably against the end of the non-elastic packing, and will simultaneously force the shoulder against the end of the lip, and the clamping ring is also preferably so constructed as to inclose and practically hermetically seal the packing ring within the clamping ring and said lip and between them and the spigot.

Referring to the drawings 1 and 2 represent respectively the two pipe sections connected by my improved joint, the bell end of the pipe section, 1, and the spigot end of the pipe section, 2, being shown. 3 represents the bell forming part of the pipe section, 1, said bell being enlarged beyond the exterior diameter of the spigot end of the pipe section, 2, and provided with a cylindrical portion, 4, the exterior of which is engaged and surrounded by a reinforcing ring, 5. The bell is provided in rear of the reinforcing ring, 5, with an annular enlargement forming a rib, 6, on the outside of the bell and providing at its forward edge a shoulder, 7, against which the reinforcing ring abuts and at its rear edge a shoulder, 8, which is adapted to be engaged by the bull ring or follower as hereinafter described.

The end of the bell extends beyond the reinforcing ring and is flared to form an outwardly extending lip, 9, the recess within which forms a packing recess to receive the elastic packing ring, and a shoulder, 10, is formed at the junction of the lip with the cylindrical portion, 4, of the bell, against which shoulder the outer edge of the reinforcing ring abuts, thus firmly securing the reinforcing ring against possibility of movement longitudinally of the bell. The outer edge or face, 11, of the lip is preferably, although not necessarily, made perpendicular to the longitudinal axis of the pipe. The spigot end of the pipe section may be perfectly plain and form merely a continuation of the body of the pipe or it may be provided with an annular groove as indicated at 12 to receive an interlocking portion of the non-elastic packing.

13 indicates the non-elastic packing which is preferably of lead although it may be of cement or other suitable material. This non-elastic packing is preferably formed of a material which will resist acids or alkalis and especially which will resist the action of gasolene and drip oil, or other liquid contents of the pipe line. This non-elastic packing holds the bell and spigot of the adjacent pipe sections in substantially rigid relation, assists in producing a tight joint, and also acts as a dam to prevent the possibility of any material within the pipe line whether liquid or gaseous but especially liquid from reaching the outer end of the bell mouth and injuriously affecting the rubber or other elastic packing which is depended upon to hermetically seal the joint and preclude the possibility of leakage of any liquid or gaseous material therefrom.

14 represents the preferred form of elastic packing which I employ in my improved joint and which is preferably provided with an annular portion, 15, wedge shaped in cross section which extends within the space between the exterior lip, 9, of the bell and the exterior surface of the spigot and has a perpendicular face, 16, to engage the end of the lead or other non-elastic packing, 13. The packing ring, 14, is also provided with an outwardly extending shoulder, 17, disposed preferably perpendicularly to the longitudinal axis of the pipes, to engage the end face, 11, of the lip, 9, and form a tight joint against said end face as well as against the inner face of the lip. It is not essential, however, that the lip, 11, and the shoulder, 17, should be perpendicular to the axis of the pipes although it is my preferred construction. The exterior end or face of the packing ring is of such form as to fit within the packing recess in the flange member of the clamping ring which flange member preferably surrounds the packing ring and extends over the outer extremity of the lip, 9, thereby substantially hermetically sealing the packing ring within the flange member and said lip.

I prefer to employ a clamping ring of the well known Dresser type such as is illustrated, for example, in the United States patent to James Clark #858,360 dated June 25th 1907, the said clamping ring being illustrated at 20 and being formed of wrought metal and provided with a flat annular plate member, 21, and a cup shaped flange member, 22, which embraces the packing ring, 14, and extends over the outer end of the lip, 9, as above stated. The plate member, 21, is provided with bolt holes for the reception of the clamping bolts. In connection with the clamping ring I employ a bull ring or follower which engages the shoulder, 8, on the bell and this bull ring or follower may be of any preferred form. I prefer, however, to employ a bull ring formed of wrought metal such as is shown and described, for example, in the United States patent to James Clark #1,051,087, dated Jan. 21st 1913, of the well known Dresser type, although other forms of bull ring may be employed. The bull ring herein shown at 25 comprises an annular plate member, 26, provided with bolt holes and having at its inner edge an inwardly extending flange portion, 27, terminating at its inner end in an outwardly flared portion, 28, forming a rounded annular shoulder, 29, which is of such diameter as to engage and fit against the shoulder, 8, of the bell.

In the preferred form of my invention as shown in the drawing all the metal parts are formed preferably of wrought metal and I have found wrought iron or steel most suitable for this purpose. The clamping ring and bull ring or follower are connected by a plurality of bolts, 30, provided with nuts, 31, the particular number and diameter of the bolts depending upon the diameter of the joint or of the parts forming the same. The clamping ring and bull ring or follower are preferably formed in one piece and slipped over the pipe sections in proper relative positions before the bell and spigot are assembled. The said rings may, however, be formed in sections and secured together, for example, as illustrated in the United States patent to James Clark #1,062,438, dated May 20th 1913 or in any other preferred manner.

In forming the joint the spigot end of one pipe section is placed within the bell end of another pipe section and the intervening space between the bell and spigot and in rear of the flange or lip, 9, is filled with the solid non-elastic packing, 13, which consolidates the joint, holds the pipe sections in proper relation with each other, and tends to prevent their longitudinal displacement, while also serving as a dam to prevent the contents of the line from reaching the packing recess within the lip, 9. The packing ring is inserted in the packing recess within the annular lip, 9, and is inclosed by the clamping ring. The bull ring or follower is brought into engagement with the shoulder, 8, of the bell and the bolts, 30, are passed through the bolt holes in the clamping ring and bull ring, and the nuts, 31, are applied to the bolts and screwed up.

The rubber packing, 15, is thereby compressed into the packing recess within the annular lip, 9, and preferably against the outer end of the non-elastic packing, and between the clamping ring and lip and the exterior surface of the spigot, thereby forming an absolutely tight joint regardless of the non-elastic packing. Even if the pipe sections move longitudinally with respect to each other so as to thereby loosen the non-elastic packing it will have no effect on the tightness of the joint as the spigot can move with respect to the rubber packing ring without effecting the tightness of the joint in any way whatever. These joints are in nearly all cases buried in the ground, and the pipe lines in which they are used extend for long distances, and the flange member of the clamping ring which preferably extends over the lip, 9, of the bell almost entirely incloses the rubber packing ring, protecting it from the effect of the surrounding earth and moisture.

It is to be noted that contacting surfaces of considerable area are provided where the rubber packing ring engages the lip, 9, and also where the inner cylindrical surface of the packing ring engages the spigot as the packing ring has a large portion of its body outside of the packing recess formed within the lip, 9, and the contact of these large surfaces insures a tight joint when the clamping ring is drawn up by the bolts. It will also be noted that the reinforcing ring not only prevents the bell from spreading when the parts are in use as a pipe joint, but also reinforces the bell at the time that the lip portion, 9, is flared outwardly and facilitates the formation of this lip.

By my invention the use of pipe lines embodying my improved joint may be extended to the conveyance of materials which cannot now be readily transmitted through pipe lines owing to their destructive effect on rubber and other elastic or compressible packings, as by my invention the tightness of the joint is secured by the rubber or other elastic packing rings while the said packing rings are protected from any injurious effects or deterioration from the contents of the pipe line.

What I claim and desire to secure by Letters Patent is:

1. In a pipe joint of the kind described, the combination with a pipe section having a bell member provided at its outer end with an outwardly flaring annular lip forming a packing recess within the same, a second pipe section provided with a spigot member located within said bell member, a compressible packing surrounding the spigot member and having a portion extending within said packing recess, and a portion extending outside of said recess, a clamping ring engaging said compressible packing ring, a follower engaging the exterior of said bell member, clamping devices connecting said clamping ring and follower, and non-elastic packing introduced between the portion of said bell in rear of said lip and the adjacent portions of the spigot, and forming a dam to prevent access of gasolene, drip oil, etc., to said compressible packing.

2. In a pipe joint of the kind described, the combination with a wrought metal pipe section provided with a bell member at one end thereof, and having an outwardly flared annular lip at the outer end of said bell member forming a packing recess within same, of a second pipe section provided with a spigot member at one end thereof located within said bell member, a rubber packing ring surrounding the spigot member and having portions extending into said packing recess, a clamping ring engaging said packing ring for compressing it between the said lip and said spigot to form a tight joint, a bull ring or follower engaging the exterior of the bell, bolts and nuts for connecting said follower and clamping ring, and non-elastic packing material introduced between the portion of said bell in rear of said lip and the adjacent portion of the spigot and forming a dam to protect the rubber packing ring from gasolene, drip oil, etc.

3. In a pipe joint of the kind described the combination with a pipe section provided at one end with a bell member having at its outer end an outwardly flared annular lip forming a packing recess within same, said bell member being provided with an annular enlargement at a distance from said lip, and a reinforcing ring surrounding the bell member and located between said lip and said annular enlargement, of a second pipe section provided with a spigot member located within the bell member, a rubber packing ring having a tapering annular portion extending into said packing recess and having a portion outside of said recess, a clamping ring having a portion surrounding said packing ring, a bull ring or follower engaging the exterior of said bull members, bolts and nuts for connecting said clamping ring and bull ring, said bell member being constructed to provide an annular recess for the reception of non-elastic packing material between the portion of the bell member in rear of said lip and the adjacent portion of the spigot member.

4. In a pipe joint of the kind described, the combination with a wrought metal pipe section provided with a bell member having at its outer end an outwardly flared annular lip forming a packing recess within the same, the outer end face of said lip being disposed substantially perpendicularly to the longitudinal axis of the pipe section, of a second pipe section having a spigot member within said bell member, a rubber packing ring having an annular tapered portion extending into said packing recess, and a shoulder substantially perpendicular to the axis of said pipe sections for engaging the outer end face of said lip, said packing ring having a body portion located outside of said recess, a clamping ring having a portion surrounding the body portion of said packing ring, a bull ring or follower engaging the exterior of the bell, bolts and nuts connecting said clamping ring and bull ring, and non-elastic packing formed of material not affected by the material passing through the pipe line introduced between the portion of the bell member in rear of said lip and the adjacent portion of the spigot member.

5. In a pipe joint of the kind described, a pipe section formed of wrought metal and provided at one end with a bell member adapted to receive the spigot member of another pipe section, said bell member being provided at its outer end with an outwardly extending lip forming a packing recess within the same, said bell member being constructed to provide a recess for the reception of non-elastic packing between said lip and the inner end of the bell member.

6. In a pipe joint of the kind described, a pipe section formed of wrought metal and having a bell member at one end thereof, provided at its outer end with an outwardly extending annular lip forming a packing recess within the same and having an annular enlargement at a distance from said lip and a re-inforcing ring surrounding said bell between said lip and annular enlargement thereof, whereby the reinforcing ring is held from longitudinal movement with respect to the bell, said bell being provided with a recess for the reception of non-elastic packing between the said lip and the inner end of the bell.

In testimony whereof I affix my signature.

WALTER L. McCLOY.